United States Patent [19]

Labriot et al.

[11] 4,286,944
[45] Sep. 1, 1981

[54] INSTALLATIONS FOR THE CALCINATION OF ALUMINA AND SIMILAR PRODUCTS

[75] Inventors: Gilbert Labriot, Marseilles; Robert Bitsch, Aix en Provence; Michel Wattelle, Les Lilas; Jean Lebesque, Avon, all of France

[73] Assignees: Aluminium Pechiney; Fives-Cail Babcock, both of Paris, France

[21] Appl. No.: 94,070

[22] Filed: Nov. 14, 1979

[30] Foreign Application Priority Data

Nov. 27, 1978 [FR] France ............................ 78 33390

[51] Int. Cl.³ .................. F27B 15/00; F27B 7/36; F27B 7/02
[52] U.S. Cl. ............................ 432/14; 423/175; 432/58; 432/105; 432/106
[58] Field of Search .............. 432/3, 103, 105, 106, 432/58, 14; 423/173, 175

[56] References Cited

U.S. PATENT DOCUMENTS

| | | | |
|---|---|---|---|
| 1,652,168 | 12/1927 | Fasting | 432/106 |
| 2,063,233 | 12/1936 | Debuch | 432/105 |
| 4,119,396 | 10/1978 | Abelitis et al. | 432/14 |

FOREIGN PATENT DOCUMENTS 203842 11/1908 Fed. Rep. of Germany .
768847 8/1934 France .
2124840 9/1972 France .

Primary Examiner—John J. Camby
Attorney, Agent, or Firm—Kurt Kelman

[57] ABSTRACT

A calcining installation of improved thermal efficiency comprises a long rotary tubular kiln having an upstream inlet, a downstream outlet and an air inlet at the downstream end. A burner is positioned in the upstream half of the kiln, the upstream part of the kiln constituting a calcining zone and the downstream kiln part constituting a cooling zone for the calcined material. A cyclone separator for separating dust from the kiln flue gases has an inlet and a dust outlet, and an additional cyclone separator has an inlet, a gas outlet and a material outlet connected to the upstream end of the kiln. A pipe connects the gas outlet of the additional cyclone separator to the inlet of the cyclone separator, the pipe having a vertical portion and an inlet for the raw material in the lower part of the vertical portion.

9 Claims, 2 Drawing Figures

INSTALLATIONS FOR THE CALCINATION OF ALUMINA AND SIMILAR PRODUCTS

The present invention concerns installations for the calcination of alumina, or of similar products, consisting of a tubular rotary kiln of substantial length, into which the product to be calcined, which may be wet, is introduced cold at one end, while a burner at the other end provides the necessary heat. It is known that the thermal efficiency of these installations is poor, mainly because losses by radiation and in flue gases are substantial, the gases leaving the kiln at temperatures in the order of 300° to 400° C.

The aim of the present invention is to modify these installations to improve their thermal efficiency and, consequently, reduce their fuel consumption.

Calcining installations have already been built involving a short rotary kiln and a preheater with cyclones at the head of the kiln and using the kiln flue gases to dry and preheat the products to be calcined; these installations have better thermal efficiency than long kiln installations. However, this solution is not satisfactory when an already existing long kiln installation is to be modified, because in this case the gases leave the kiln at relatively low temperature and the slight improvement which would result from the installation of a preheater at the head of the kiln would not justify the investment costs.

According to the invention, the thermal efficiency of calcining installations with a long rotary kiln and one or several cyclones for removal of dust from the kiln flue gases is improved by placing the burner in the upstream half of the kiln, the downstream half being used as a cooler for the calcined product, and placing at the head of the kiln a preheater with at least one further cyclone, the inlet of which is connected to the inlet of the kiln, and a pipe linking the further cyclone outlet to the inlet of the dust removal cyclone or cyclones, and having a vertical section, the product to be calcined being introduced into the lower part of the vertical section of the pipe and carried by the circulating gases to the dust removal cyclones, then separated from the gases in these cyclones, reintroduced into the gas flow upstream of the further cyclone, then separated from the gases in this further cyclone and introduced into the kiln.

It is preferable that the burner be placed approximately one third of the way along the kiln, starting at its upsteam or inlet end. It is fed with fuel and possibly with primary air through pipes running along the kiln and connected to stationary pipes by rotating seals placed at one end of the kiln. Alternatively, primary air can be supplied to the burner by a fan mounted on the kiln. Secondary air is supplied at the downstream or delivery end of the kiln and circulates in the kiln, in the opposite direction to the calcined product, up to the burner. A narrow section in the shape of a venturi is provided inside the kiln, in the burner area.

The pipe linking the further cyclone to the dust removal cyclones has a descending and a vertical ascending section, connected by a U section, and the product to be calcined is introduced into the lower portion of the ascending section which has a restricted cross-sectional area. On top of this inlet zone is a swirling area the cross-section of which is larger than that of the upper portion of the ascending section of the pipe. A system can be provided for the injection of pressurized gas into the U-shaped section of the pipe to avoid clogging.

Other characteristics of the invention will become evident on reading the following description which refers to the accompanying drawings.

Figure 1:
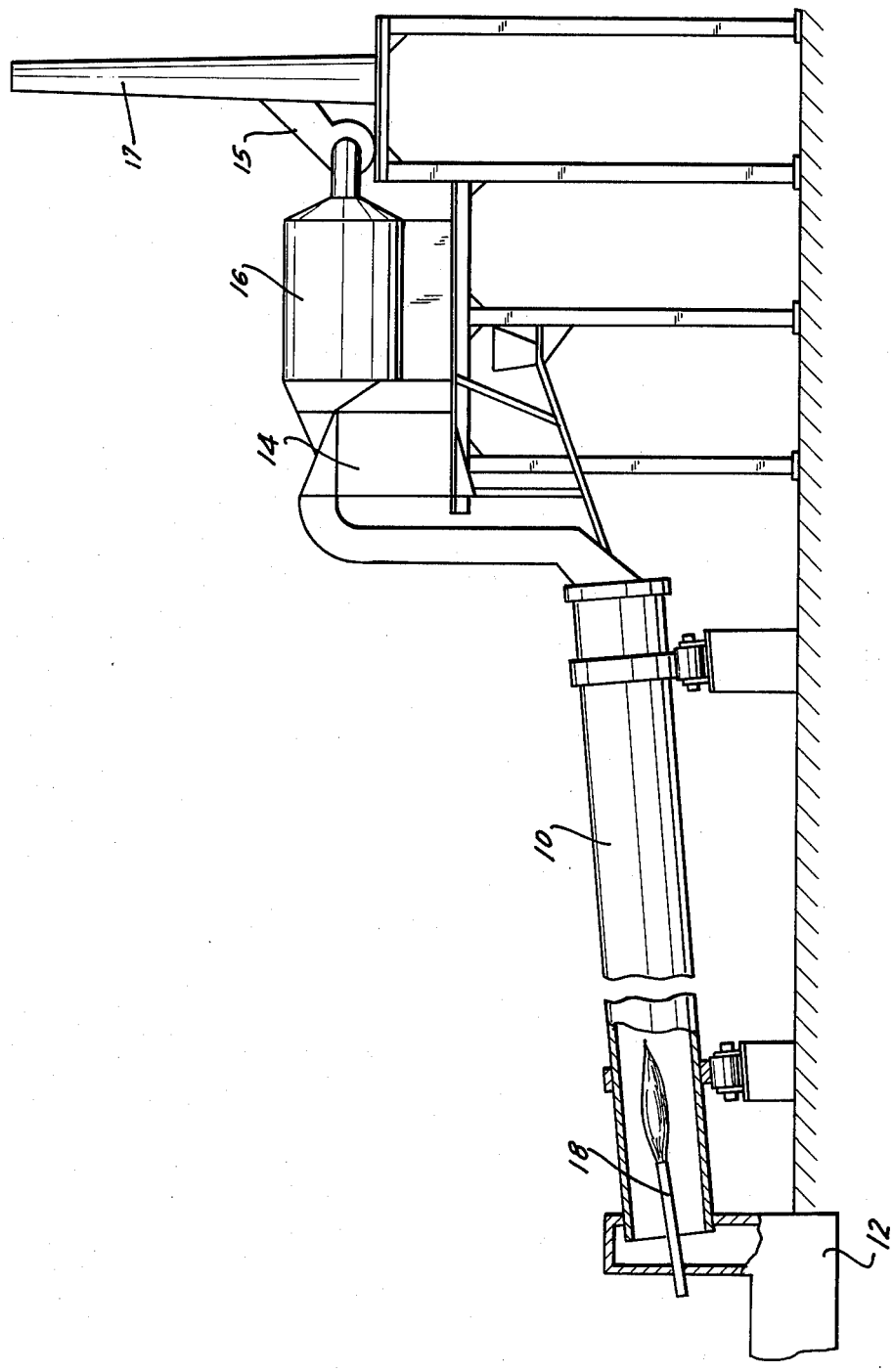
FIG. 1 is a schematic diagram for a conventional calcining installation with a long kiln.

The installation shown in FIG. 1 consists essentially of a tubular rotary kiln 10 of substantial length, a cooler 12, a multicyclone 14 and a filter 16 designed to remove dust from the kiln gases. The multicyclone consists of a battery of cyclones fed in parallel.

The product to be calcined is introduced upstream of the kiln, the dust being collected in multi-cyclone 14 and filter 16. The kiln is slightly inclined so that the product moves from the inlet or upstream end to the outlet or downstream end due to the action of gravity and the rotation of the kiln. During its passage through the kiln the product is in contact with the gases resulting from the combustion of a fuel injected by a burner 18 situated at the downstream end of the kiln and the air admitted at this same end. When it leaves the kiln, the calcined product is cooled in cooler 12. The kiln gases are drawn out by a fan 15 and are discharged into the atmosphere via chimney 17, after dust removal in multicyclone 14 and filter 16.

Figure 2:
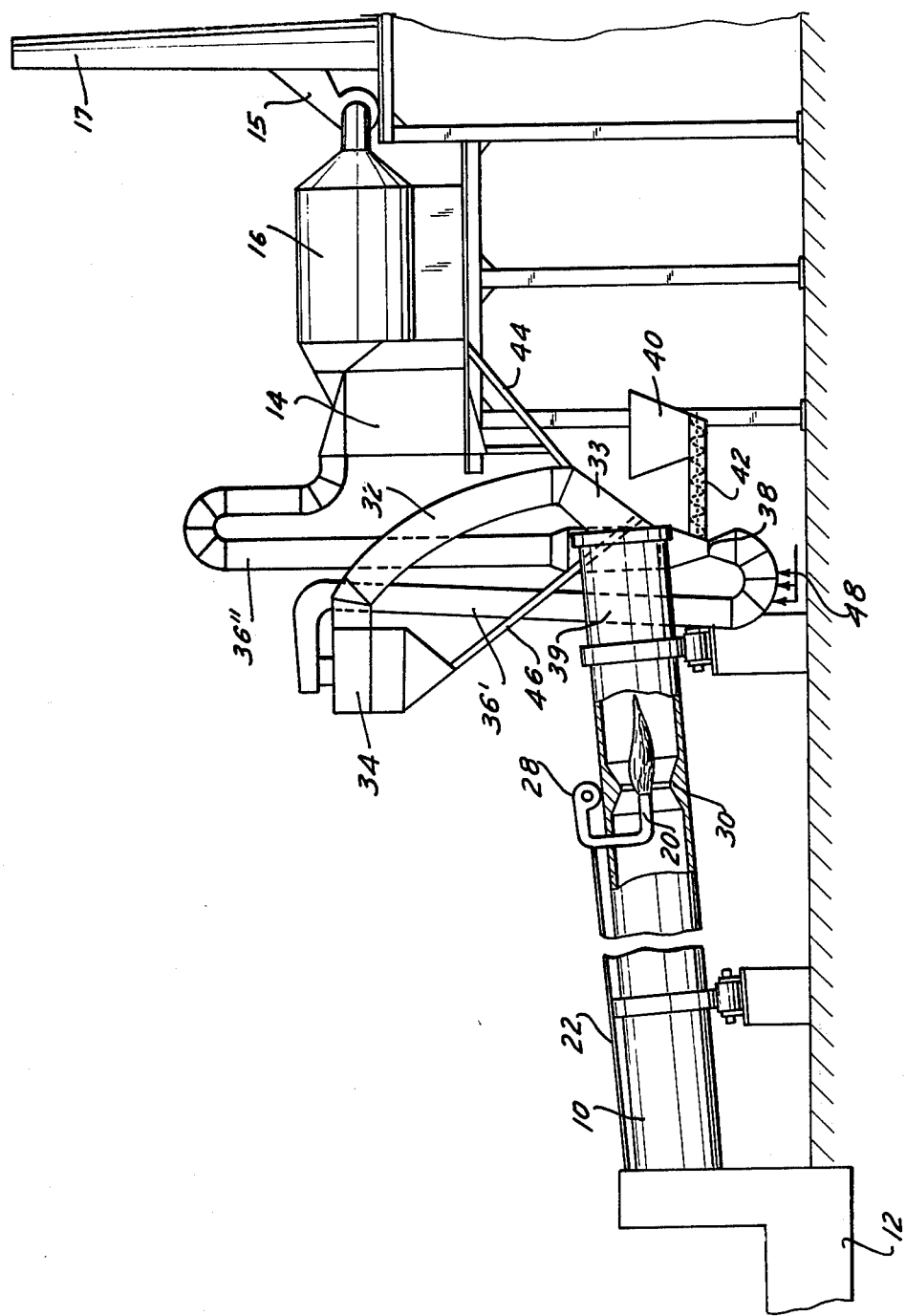
FIG. 2 is a schematic diagram for an installation modified according to the invention.

In the installation in FIG. 2 long kiln 10, multicyclone 14 and filter 16 have been retained in the position they occupied in the original installation to reduce conversion costs to a minimum.

Burner 18 has been removed and a burner 20 has been placed in the upstream half of the kiln, approximately one third of the way along the kiln from its upstream end. Burner 20 is fed with fuel by a pipe 22 which runs along the kiln and is connected to a feed pipe by a rotating seal placed at the downstream end of the kiln. Primary air is supplied to burner 20 by a fan 28 attached to the shell of the kiln and driven by an electric motor fed through a collector, the rings of which are fixed onto the kiln. A restricted passage 30 in the shape of a venturi is provided inside the kiln, in the zone where the burner stands.

The upstream end of the kiln is connected to the inlet side of a cyclone 34 by a duct 32, the lower part of which forms a feed chute 33 which enters the kiln; a sealing gasket is provided between the kiln and the chute. The gas outlet of this cyclone is linked to the inlet of multicyclone 14 by a pipe 36 with a descending section and an ascending section 36" connected at their bottom by a U-shaped section. The ascending section is almost vertical and has a zone 38 in its lower part with a restricted cross-sectional area. A hopper 40 and a screw feed system 42 allow the insertion of the product to be calcined just above the narrowest part of zone 38. This zone is of venturi type and section 39 of the pipe which is connected to the divergent part of the venturi is of large enough diameter to allow the formation of swirls that promote thermal exchange. Beyond this part the diameter of the pipe is reduced in such a way as to allow the product to be driven by the gases.

The dust outlets provided on multicyclone 14 and filter 16 are linked by pipes 44 to duct 32 and the tip of cyclone 34 is linked to chute 33 by a pipe 46.

Injectors 48 provided in the lower U-shaped section of pipe 36 allow the injection of air or another gas to avoid clogging.

When the system is operating, the air drawn into the downstream end of the kiln, possibly across cooler 12, by draught fan 15, circulates in the kiln as far as burner 20, where the combustion of fuel injected into the air current produces gases at high temperature which move towards the upper end of the kiln and then flow through duct 32, cyclone 34, pipe 36, multicyclone 14 and filter 16 before being expelled into the atmosphere through chimney 17.

The product to be calcined is introduced into pipe 36 by means of feed unit 42 and driven by the gases as far as multicyclone 14. If the product is wet, it is dried during its passage through pipe 36, the length of the latter being chosen to suit this purpose, so that there is no risk of clogging the multicyclone. In the latter, the product is separated from the gases and, via pipe 44, introduced into duct 32 where it comes into contact with the gases leaving the kiln at high temperature. It is driven by the gases as far as cyclone 34 and then separated from these and introduced into the kiln through pipe 46 and chute 33.

In the first section of the kiln product undergoes the final stage of calcination. Beyond narrow section 30, the calcined product is cooled by air circulating in the downstream section of the kiln.

At the kiln outlet, the product may undergo additional cooling in cooler 12.

Given that heat exchange between gases and solids is much more substantial in the preheater made up of duct 32, cyclone 32, pipe 36 and multicyclone 14 than in the kiln, fuel consumption will definitely be less than in the installation shown in FIG. 1, for the same amount of production; for the production of anhydrous alumina using hydrated alumina at 13% moisture as raw material, the reduction in consumption is approx. 20%.

Furthermore, as the modifications to the kiln are not very important and the parts added: duct 32, cyclone 34 and pipe 36 are static elements, simple to make and inexpensive, capital expenditure is relatively low and rapidly compensated.

The installation described above is, of course, only an example. Various modifications are possible, particularly as far as the use of technically equivalent systems is concerned, without departing from the basic characteristics of the invention. In particular, several cyclones may be used in series or in parallel between the kiln and multicyclone 14. Precalcination of the product is also possible, before it enters the kiln, either in duct 32, or in a chamber placed upstream of the kiln, the heat necessary for this reaction being supplied by combustion of a fuel and of air flowing, for example, from cooler 12 and brought to the precalcination area across the kiln or through an external pipe.

What we claim is:

1. The method of improving the thermal efficiency of a calcining installation comprising a long rotary kiln having an inlet for raw material to be calcined at an upstream end thereof and an outlet for the calcined material at a downstream end thereof, a burner generating heat in the kiln for calcining the raw material, an air inlet at the downstream end, a flue gas outlet at the upstream end, and a cyclone separator means for separating dust from the flue gas exhausted through the flue gas outlet, the cyclone separator means having an inlet connected to the flue gas outlet and a dust outlet, which comprises the steps of
    (a) cycling the raw material through an additional cyclone separator having an inlet for the raw material, a gas outlet and an outlet for the raw material, and from the raw material outlet into the upstream end of the kiln,
        (1) the raw material inlet of the additional cyclone separator being connected to the upstream end of the kiln and the gas outlet of the additional cyclone separator being connected to the inlet of the cyclone separator means through a pipe having a vertical portion,
    (b) introducing the raw material in a lower part of the vertical pipe portion for preheating the raw material by the flue gas before the raw material passes through the raw material inlet of the additional cyclone separator,
    (c) subjecting the raw material cycled into the upstream end of the kiln to the heat generated by the burner in a half of the kiln adjacent the upstream end for calcining the preheated raw material, and
    (d) cooling the calcined material in the other half of the kiln adjacent the downstream end thereof.

2. The method of claim 1, wherein the burner is placed into the upstream half of the kiln approximately one third of the way along the kiln from the upstream end.

3. The method of claim 1, comprising the further step of forming a narrow passage in the shape of a converging-diverging nozzle in the zone of the kiln where the burner is placed.

4. A calcining installation comprising
    (a) a long rotary tubular kiln having an inlet for raw material to be calcined at an upstream end thereof and an outlet for the calcined material at a downstream end thereof, and an air inlet at the downstream end,
    (b) a burner positioned in the upstream half of the kiln,
        (1) the upstream part of the kiln constituting a calcining zone and the downstream part of the kiln constituting a cooling zone for the calcined material,
    (c) a cyclone separator means for separating dust from the kiln flue gases, the cyclone separator means having an inlet and a dust outlet,
    (d) an additional cyclone separator having an inlet, a gas outlet and a material outlet connected to the upstream end of the kiln, and
    (e) a pipe connecting the gas outlet of the additional cyclone separator to the inlet of the cyclone separator means, the pipe having a vertical portion and an inlet for the raw material in the lower part of the vertical portion.

5. The calcining installation of claim 4, wherein the burner is positioned approximately one third of the way along the kiln from the upstream end.

6. The calcining installation of claim 4, further comprising a narrow passage in the shape of a converging-diverging nozzle in the zone of the kiln where the burner is positioned.

7. The calcining installation of claim 4, wherein the pipe has a descending portion, an ascending portion and a U-shaped portion connecting the descending and ascending portions at lower ends thereof, the ascending portion having a zone of a restricted cross-sectional area in a lower part thereof, and the inlet for the raw material to be calcined being positioned in the zone of restricted cross-sectional area.

8. The calcining installation of claim 7, further comprising gas injectors in the U-shaped pipe portion for preventing clogging.

9. The calcining installation of claim 7, wherein the ascending pipe portion has a swirling zone in a lower part thereof above the zone of restricted cross-sectional area, the cross-sectional area of the swirling zone being larger than that of the upper part of the ascending pipe portion.

* * * * *